Aug. 21, 1928.
J. C. SLOANE
1,681,791
AUTOMOBILE SIGNAL
Filed Nov. 26, 1926
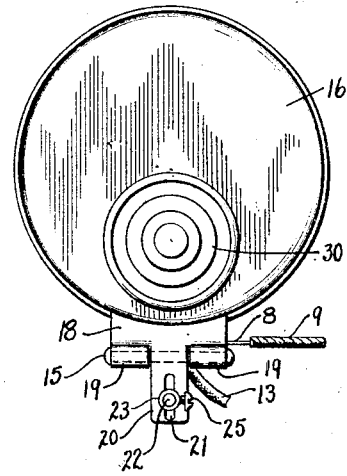
Fig. 1.
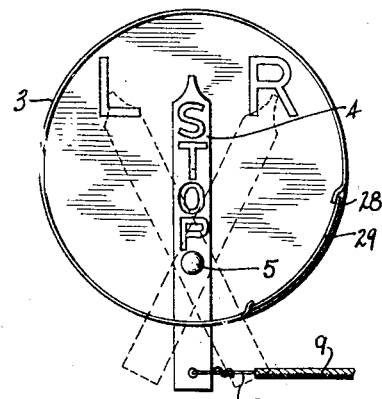
Fig. 3.
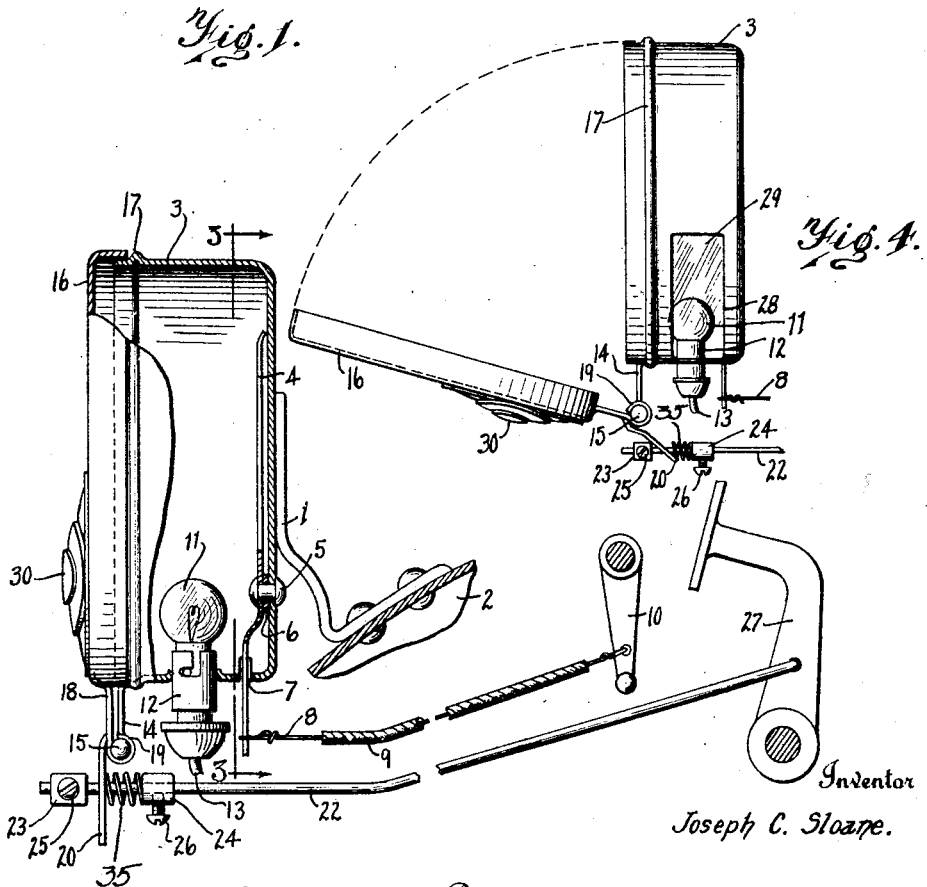
Fig. 4.
Fig. 2.
Inventor
Joseph C. Sloane.
By
Charles E. Kraus
Attorney Patented Aug. 21, 1928.

1,681,791

UNITED STATES PATENT OFFICE.

JOSEPH C. SLOANE, OF DETROIT, MICHIGAN, ASSIGNOR OF ONE-HALF TO ALFRED T. HARROW, OF DETROIT, MICHIGAN.

AUTOMOBILE SIGNAL.

Application filed November 26, 1926. Serial No. 150,719.

This invention relates to automobile signals and the object of the invention is to provide a signal for the rear of an automobile which is operated by single electric light. Another object of the invention is to provide an automobile signal adapted to be normally used as an automobile tail light. A further object of the invention is to provide an automobile signal comprising a casing, the cover of which is adapted to swing downwardly to expose the signal upon actuation of the foot brake. Another object of the invention is to provide an automobile signal adapted to indicate a left or right hand turn or a stop, the means for indicating a left or right hand turn being connected with the steering arm of the automobile. A further object of the invention is to provide an automobile signal combining a means for indicating a stop or a left or right hand turn and a means for illuminating the usual automobile license plate with the usual automobile tail lamp. These objects and the several novel features of the invention are hereinafter more fully described and claimed and the preferred form of construction by which these objects are attained is shown in the accompanying drawings in which—

Fig. 1 is an elevation of the automobile signal as seen from the rear.

Fig. 2 is a side elevation of the signal partly in section showing the connection with the foot brake and steering arm.

Fig. 3 is a section taken on line 3—3 of Fig. 2.

Fig. 4 is a side elevation of the device with the cover turned down to expose the signals.

As shown in Fig. 2 a bracket 1 is riveted on the rear fender 2 and this bracket is preferably spot welded to the signal casing 3. The interior face of the signal casing is preferably painted one color with the letters L and R thereon in a contrasting color, the letters preferably being in white on a black background. An indicator or pointer 4 is pivotally mounted on a rivet 5, the pointer being supported on a washer 6 between the bottom of the casing 3 and the body thereof. This pointer is provided with an end which extends downwardly through a slot 7 provided in the casing and a stiff wire 8 is secured to the lower end thereof, the wire 8 passing through a flexible tubing 9 and being secured at the opposite end to the steering arm 10 of the automobile. The pointer 4 is preferably colored white with the word "STOP" thereon in black or other contrasting colors may be used if desired. An incandescent electric lamp 11 is mounted in a socket 12 provided therefor and secured in the casing 3, the said lamp being connected by means of wires 13 to a source of current supply such as the automobile storage battery. As shown in Figs. 2 and 4 a portion 14 is formed integrally with the casing 3 and supports a hinge pintle 15. As shown in Figs. 1 and 2 a cap fits over the open end of casing 3 and engages a bead 17 formed in the casing. This cap is provided with a portion 18 struck out from the side thereof comprising two depending ends 19 which are bent around the hinge pintle 15 as shown in Fig. 2 and a depending end 20 is provided having a slot 21 therein through which a rod or heavy wire extends. A pair of stops 23 and 24 are adjustably secured on the rod 22 by the screws 25 and 26, the said stops engaging the depending end 20 upon longitudinal movement of the rod 22. The opposite end of the rod 22 extends forward beneath the automobile body and is connected to the brake pedal 27 as shown in Fig. 2 so that movement of the said pedal in either direction produces longitudinal movement of the rod 22. As shown in Figs. 3 and 4 the casing 3 is provided with an aperture 28 in the side thereof and a strip of transparent celluloid 29 is secured over this aperture so that the incandescent lamp 11 may shine therethrough and illuminate the automobile license plate which is secured adjacent to the aperture 28. As shown in Figs. 1 and 2 the cap 16 is provided with a red lens 30 immediately behind the incandescent lamp 11 and when the said lamp is lighted the lens 30 provides a red tail light of the usual type.

In operation when the brake pedal 27 is depressed the rod 22 is drawn to the right of Fig. 2 causing the stop 23 to engage the depending end 20 and turn the cap 16 on the hinge pintle 15 to the position shown in Fig. 4. This exposes the interior of the casing 3 as shown in Fig. 3, the pointer being in the position shown in full line at this time and indicating "STOP". As shown in Figs. 1 and 3 the flexible tubing 9 makes a right angle turn before extending forward to the steering arm 10 and should the steering arm be turned in one direction or the other when the interior of the casing is exposed as shown in Figs. 3 and 4 the pointer 4 will be moved by the stiff wire 8 to the position shown in dotted lines in Fig. 3 to indicate a left or right hand turn. On account of the contrasting colors of the pointer 4 and the interior of the casing 3, the signals will stand out sharply in the daylight and at night the interior of the casing and pointer is illuminated by the incandescent lamp 11 and will thus bring out the signals sharply in the dark, the said incandescent lamp also illuminating the license plate and acting as a tail lamp when lighted. Upon release of the brake pedal 27 the rod 22 will be moved to the left of Fig. 4 at which time the stop 24 engages the depending end 20 and turns the cap 16 back to the position shown in Fig. 2, the cap remaining in this position until the foot brake is again actuated to bring the stop 23 into engagement with the depending end 20.

If desired a coiled spring 35 may be provided on the rod 22 between the stop 24 and the depending end 20 of the cover as shown in Figs. 2 and 4 so that the said coiled spring applies a tension to the end 20 of the cover when in the closed position to hold it in place against the vibration of the automobile.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. An automobile signal comprising a casing having signals indicating a left or right hand turn, a pointer pivotally mounted in the casing and adapted to be moved over the signals, an incandescent lamp within the casing adapted to illuminate the pointer and signals, means connecting the pointer with the automobile steering mechanism whereby operation of the steering mechanism in either direction produces a corresponding movement of the pointer, a cap hinged to the lower side of the casing and adapted to form a cover therefor, the said cap being provided with a depending end, a rod connecting the said depending end of the cap with the automobile brake pedal whereby actuation of the pedal moves the cap on its hinge to expose the pointer and signals and release of the brake pedal moves the cap to cover the pointer and signals.

2. An automobile signal comprising a casing, a pointer pivotally mounted in the casing and carrying the word "STOP" the pointer having a depending end extending through a slot provided therefor in the casing, a wire connecting the depending end of the pointer with the steering arm of the automobile, a flexible tube through which the wire is longitudinally moved in either direction by movement of the steering arm to produce a corresponding movement of the pointer, an incandescent bulb for illuminating the pointer and interior of the casing, a cap adapted to cover the casing and the pointer and means whereby actuation of the automobile brake pedal moves the cap to expose the pointer.

3. An automobile signal comprising a casing adapted to be mounted on the rear of the automobile and having the letters L and R on the left and right hand side respectively to indicate a left or right hand turn, a pointer pivotally mounted in the casing and carrying the word "STOP," means connecting the pointer with the automobile steering mechanism whereby a right or left hand turn of the steering mechanism moves the pointer over the respective letter L or R, a cap for the casing normally covering the signals, an incandescent lamp for illuminating the interior of the casing, a red lens positioned in the cap directly behind the said lamp and means whereby actuation of the automobile foot brake moves the cap to expose the signals.

4. An automobile signal comprising a casing having the letters L and R on a background of contrasting color, a pointer pivotally mounted in the casing and movable over the letters and carrying the word "STOP," means connecting the pointer with the automobile steering mechanism whereby operation of the steering mechanism in either direction produces a corresponding movement of the pointer, a cap for the casing adapted to cover the signals and means whereby actuation of the automobile foot brake moves the cap to expose the signals.

In testimony whereof, I sign this specification.

JOSEPH C. SLOANE.